Figure 1:
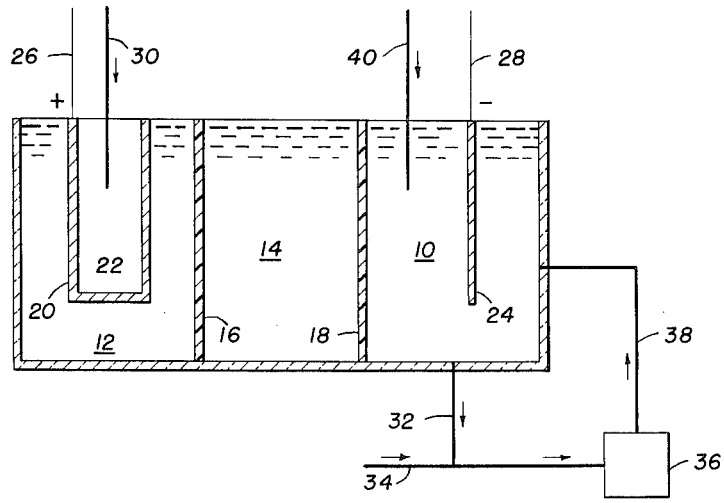

March 1, 1966

D. L. KLASS ETAL 3,238,066

METHOD OF GENERATING ELECTRICITY USING
A POLYHYDRIC PHENOL–OXYGEN FUEL CELL

Filed Nov. 22, 1961

INVENTORS
DONALD L. KLASS
BY  LE ROI E. HUTCHINGS

Edward H. Lang
ATTORNEY

United States Patent Office

3,238,066
Patented Mar. 1, 1966

3,238,066
METHOD OF GENERATING ELECTRICITY USING A POLYHYDRIC PHENOL-OXYGEN FUEL CELL
Donald L. Klass, Barrington, and Le Roi E. Hutchings, Crystal Lake, Ill., assignors, by mesne assignments, to Union Oil Company of California, Los Angeles, Calif., a corporation of California
Filed Nov. 22, 1961, Ser. No. 154,258
13 Claims. (Cl. 136—86)

This invention relates to an electrochemical process for generating electricity and, more particularly, to fuel cells utilizing a reversibly-oxidizable organic intermediate reductant and a primary fuel which is oxidized by the oxidized form of the intermediate reductant.

In recent years, fuel cells have received considerable attention in the continuing quest for improved sources of electrical energy. A fuel cell is an electrochemical device in which part of the energy of a chemical reaction is converted directly into direct-current electrical energy. One of the most significant advantages of fuel cells over conventional methods of generating electricity is the directness by which chemical energy is converted into electrical energy. This direct conversion of energy eliminates the necessity of converting energy into heat, thereby making the Carnot-cycle efficiency limitation inapplicable. Other possible advantages of fuel cells are quietness, cleanliness, and the reduction or complete elimination of moving parts.

In general, a fuel cell consists of two electrodes disposed in spaced relationship in an electrolyte. In the operation of a typical fuel cell utilizing an aqueous alkaline solution as the electrolyte, a halogen or an oxygen-containing gas is continuously introduced at the oxygen electrode where it contacts the electrolyte and forms ions, imparting positive charges to the oxygen electrode. Simultaneously, a reductant, the fuel, in the electrolyte at the fuel electrode forms ions and leaves the anode negatively charged. The electrical charges imparted to the electrodes are utilized as electrical energy by connecting an external circuit to the electrodes, while the ions migrate in the electrolyte to unite and form a neutral molecule. For example, in the case of an oxygen-hydrogen fuel cell, the hydroxyl ions that are formed at the oxygen electrode migrate across the aqueous alkaline electrolyte and unite with hydrogen ions to form water. An undesirable characteristic of many of the fuel cells which have been heretofore proposed is that the neutral molecules formed by the uniting of the ions, such as water in the case of an oxygen-hydrogen fuel cell, accumulate in the electrolyte and result in a decline in the ability of the cell to generate electricity.

This invention is based on a new process for generating electricity by fuel cells. In this process, the aqueous electrolyte solution in the anodic section of a fuel cell contains in solution a reversibly-oxidizable compound in combination with a reducing compound capable of regenerating the reduced form of the reversibly-oxidizable compound from its oxidized form. Air or other oxygen-containing gas is introduced continuously into the electrolyte in the cathodic section.

An object of this invention is to provide a new electrochemical process for generating electricity.

Another object of this invention is to provide a novel fuel cell containing an intermediate reductant and a fuel in the anodic section of the electrolyte.

Still another object of the invention is to provide a novel fuel cell containing in solution in the anodic section of the electrolyte a reversibly-oxidizable compound and a fuel which is oxidized by the oxidized form of the reversibly-oxidizable compound.

A still further object of this invention is to provide a process for removing water that is formed as a by-product in the operation of a fuel cell.

Figure 2:
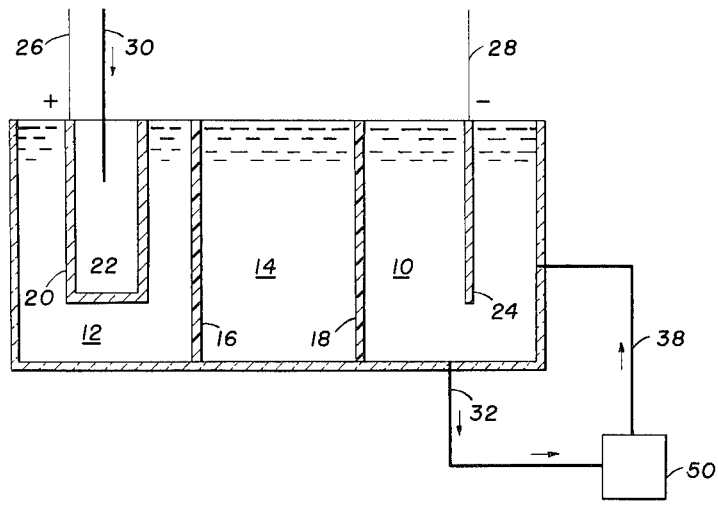

These and further objects of this invention will become apparent as the description proceeds and reference is made to the accompanying drawings in which:

FIGURE 1 is a flow diagram, partly schematic and partly in cross-section, illustrating one embodiment of this invention showing a fuel cell in cross-section and integrated with a system for removing the oxidized form of the fuel; and FIGURE 2 is a flow diagram partly schematic and partly in cross-section, illustrating another embodiment of the invention showing a fuel cell in cross-section and a continuous recirculating system for regenerating the fuel.

In accordance with this invention, an oxygen-containing gas is continuously introduced into the cathodic section of an aqueous electrolyte solution where it reacts chemically with the electrolyte and releases electrical charges to the cathode. The electrolyte in the anodic section of the fuel cell contains in solution a reversibly-oxidizable intermediate reductant that is oxidized in the electrolyte and releases electrical charges to the anode, and the primary fuel, a compound which is oxidized by the oxidized form of the reversibly-oxidizable compound. The intermediate reductant is converted back to the reduced form for further participation in the anodic reaction by the oxidation of the primary fuel. If water is formed as a by-product by the oxidation of the intermediate reductant, the reversibly-oxidizable compound, the fuel utilized is a compound that consumes water when it is oxidized by the intermediate reductant. Preferably, the intermediate reductant and the fuel utilized are so chosen that when the intermediate reductant is reduced by the fuel, the same amount of water is consumed as when it is oxidized. It will be evident that under the operating conditions of the cell, i.e., temperature, pressure, electrolytic environment, etc., the fuel must be oxidized less readily than the intermediate reductant.

Water-soluble intermediate reductants and primary fuels or reductants can be mixed directly with the aqueous electrolyte solution. Water-insoluble intermediate and primary reductants may also be used provided a solubilizing agent is mixed with the aqueous electrolyte solution, in an amount sufficient to obtain complete solution of the water-insoluble compound, prior to the addition of the water-insoluble compounds. A gaseous primary fuel can be added by being continuously bubbled through the anodic section of the electrolyte. Should a solubilizing agent be used, it will be evident that it must be substantially chemically inert with respect to the intermediate reductant and primary fuel. Suitable solubilizing agents include the so-called neutral soaps consisting of a high-molecular-weight fatty acid radical bearing from three to twenty ethylene oxide groups and an alcohol radical.

Since the immediate reduction of the oxidized form of the intermediate reductant, as it is formed, back to the reduced form is attained by the oxidation of the primary fuel, the primary fuel that is utilized is one that can be regenerated within the anodic section, or whose oxidized form can be removed from the anodic section and either discarded or regenerated. The primary reductant can be either an organic or inorganic compound. As hereinbefore stated, an obvious limitation on the choice of the primary fuel is that it must be oxidized less readily than the intermediate reductant.

The fuel cell can be divided into two zones in electrolytic communication with one another, the anode disposed in one of the zones and the cathode disposed in the other zone, or depending on the primary fuel and intermediate reductant utilized, the electrolyte can be one zone in which both the anode and cathode are disposed. Ion-permeable membranes can be utilized to divide the fuel cell into two zones. Preferably, the fuel cell is divided by two permeable membranes into three sections, an anode section and a cathode section, and an intermediate electrolyte section. The ion-permeable membranes serve to concentrate the oxygen-containing gas in the cathode section, and to concentrate the intermediate and primary reductants in the anode section, while permitting the migration of the hydroxyl ions from the cathode section to the anode section. Suitable ion-permeable membranes are known in the art and include animal tissue, various gels, including silica gel and alumina gel, sponge saturated with agar gel, and paper dipped in collodion or agar gel. Other suitable membranes may be formed by molding or casting a partially polymerized ion exchange resin into sheet form as described in "Amberplex Ion Permeable Resins," Rohm & Haas Co., Philadelphia (1952). If ion-permeable membranes are not utilized, it will be evident that the amount of the primary and intermediate reductants required will be greater than if membranes are used, and that the compounds used must not react with oxygen to any appreciable extent.

The electrolyte utilized must not react directly to any appreciable extent in the un-ionized form with the oxygen-containing gas or reductants, and it must not change permanently its chemical composition during the operation of the fuel cell. In addition, it will be evident that the electrolyte utilized must permit the migration of the ions formed during the operation of the fuel cell. For example, the electrolyte may be alkaline or acidic, depending on the nature of the primary and intermediate reductants used. If an alkaline electrolyte is required, strong bases which produce large numbers of hydroxyl ions in the process of dissociation are preferred. Alkali metal hydroxides, such as lithium, sodium, and potassium hydroxides, are representative of strong basic electrolytes that can be used.

The method of introducing the oxygen-containing gas into the cathodic section of the fuel cell, and the oxygen electrode (the cathode) can be any of those which have been heretofore proposed or which are subsequently devised. For example, the oxygen electrode can be a hollow, porus carbon electrode prepared in accordance with U.S. Patent 2,912,478, or a hollow, sintered structure prepared from a sintered inert metal such as tantalum impregnated with platinum black, with the oxygen-containing gas being introduced into the hollow interior of the oxygen electrode and forced through the porous electrode into the electrolyte. In general, the fuel electrode (the anode) can be any of the conventional electrodes now known. For example, transition metals or alloys as such, or deposited on a conductive substrate, such as carbon, can be used.

There are several alternative methods of operating the novel fuel cell of our invention. In one embodiment, the oxidized form of the fuel is continuously removed from the electrolyte while fresh fuel is added. The fuel cell can also be operated by being integrated into a continuous recirculating system for removing the oxidized form of the fuel, chemically or electrically regenerating the spent fuel, and adding the regenerated fuel to the electrolyte. In these embodiments, it will be apparent that the rate at which electric power is produced will be a function of the rate at which fresh or regenerated fuel is added to the electrolyte. In another embodiment of this invention, the fuel cell is operated as a storage battery by being used until part or all of the fuel has been oxidized, and then reversibly charging the anodic section to reduce the oxidized form of fuel.

As an example of this invention, the transformation of hydroquinone to quinone can be separated into two half-cell reactions to yield useful electrical energy, as represented by the equation:

Reaction at anode

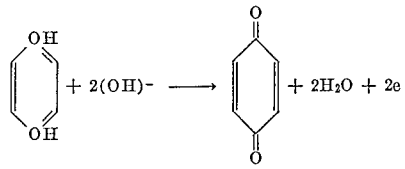

Reaction at cathode $$1/2O_2 + H_2O + 2e \rightarrow 2(OH)^-$$

Overall cell reaction

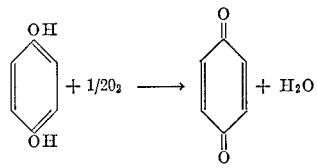

When the external circuit is closed, the reaction proceeds by the transfer of two electrons through the external circuit for every molecule of the hydroquinone oxidized. However, the following undesirable characteristics have prevented the use of hydroquinone in fuel cells: (1) Relatively little electrical energy is obtained before the hydroquinone has been consumed and the cell has become exhausted, (2) the reactants in the anode chamber are gradually diluted by the water produced in the reaction, thereby reducing the current density on the electrode, and (3) the efficiency of the cell is adversely affected by the consumption of part of the hydroquinone in the formation of quinhydrone complex after part of the hydroquinone has been oxidized.

When hydroquinone is used in accordance with this invention, these undesirable characteristics are eliminated and the efficiency of the cell is greatly enhanced. We have found that the incorporation into the electrolyte of a compound that is oxidized by the quinone results in the immediate reduction of the quinone, as it is formed, back to the hydroquinone for further participation in the anodic reaction and liberation of electrons. The addition of a reductant prevents the formation of quinhydrone complex, and also maintains the hydroquinone concentration substantially constant. The reductant is consumed when the cell is used, while the hydroquinone is preserved.

Specifically, we have found that when the electrolyte contains in solution a hydroquinone, such as the sodium salt of anthrahydroquinone-β-sulfonate, in combination with a compound that is oxidized by the quinone in the operation of the fuel cell, such as sodium hydrosulfite, the following reactions proceed efficiently in the anode section:

Reaction at anode

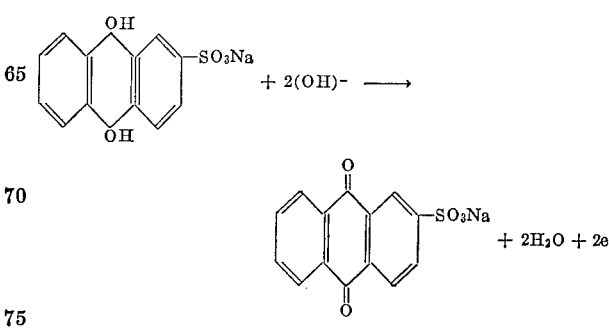

Regeneration reaction

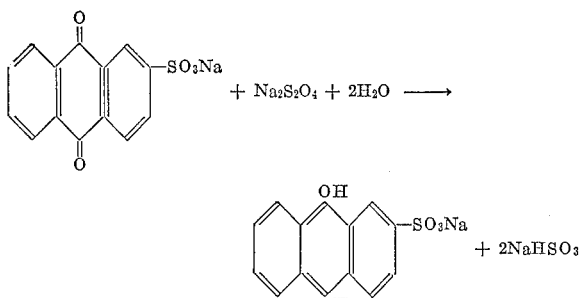

Overall anodic reaction

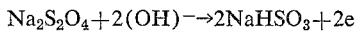
$Na_2S_2O_4 + 2(OH)^- \rightarrow 2NaHSO_3 + 2e$

It is apparent that the consumption of water in the regenerative reaction of the quinone prevents a dilution of the electrolyte in the anodic section of the cell. Sodium bisulfite, which is soluble in water, is the only reaction by-product and causes little, if any, change in the volume of the solution.

Compounds other than sodium hydrosulfite may be used as the primary reductant in the anode section. For example, a hydrocarbon such as ethylene may be used, as represented by the equations:

Reaction at anode

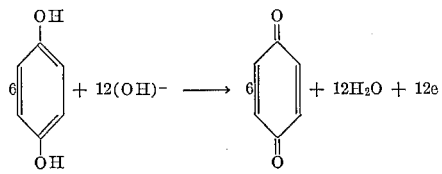

Regenerative reaction

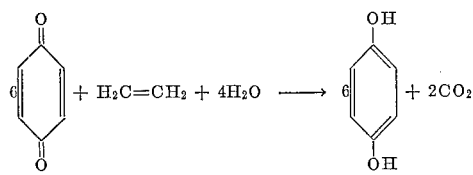

Overall anodic reaction

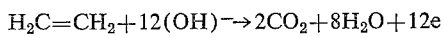
$H_2C=CH_2 + 12(OH)^- \rightarrow 2CO_2 + 8H_2O + 12e$

In addition to hydroquinone and anthrahydroquinone, other hydroquinones, such as diphenohydroquinone, o-benzohydroquinone, β-naphthohydroquinone, and α-naphthohydroquinone, may be used. The hydroquinone used in accordance with this invention may or may not contain substituents such as $NH_2$, $N(CH_3)_2$, and $CH_3$, on its nucleus. The presence of meta-directing substituents, such as halogens, $NO_2$, CN, COCH, $SO_3H$, etc., may be desirable in instances where the oxidation potential of the fuel is higher than that of the hydroquinone without the substituents because of the effectiveness of the meta-directing substituents in increasing the oxidation potential of the hydroquinones.

For a more complete understanding of the fuel cells of this invention, reference is made to the drawings which are schematic flow diagrams of two embodiments of the cells of this invention. Referring to FIGURE 1, the fuel cell comprises anode section 10, cathode section 12, and intermediate electrolyte section 14, separated from each other by ion-permeable membranes 16 and 18. The oxygen electrode (the cathode) 20 is a porous, carbon body, having hollow interior 22. Fuel electrode 24 (the anode) is platinum-black deposited on a nickel screen. The electrolyte is a concentrated aqueous potassium hydroxide solution. At the start of the operation of the fuel cell, the electrolyte in anode section 10 contains a reversibly-oxidizable organic compound, such as the sodium salt of anthrahydroquinone -β-sulfonate, and the primary fuel, such as sodium hydrosulfite. Leads 26 and 28 connected to electrodes 20 and 24, respectively, are used to deliver electric current to the apparatus being operated by the fuel cell. During the operation of the cell, an oxygen-containing gas is supplied to cathode section 12 through inlet 30 and hollow interior 22 where it is forced through the walls of oxygen electrode 20. In anode section 10, the sodium salt of anthraquinone -β-sulfonate that is formed along with water, is immediately reduced back to the hydroquinone by the sodium hydrosulfite. In the reduction of the quinone, the sodium hydrosulfite is oxidized to sodium bisulfite, and water is consumed. A portion of the electrolyte in anode section 10, containing hydroquinone, sodium hydrosulfite, and sodium bisulfite, is withdrawn continuously through line 32 and combined with a non-oxidizable, non-condensable carbonyl compound, such as acetone, introduced through line 34. The solid addition compound resulting from the reaction of sodium bisulfite and the carbonyl compound is removed from the solution by filter 36, and the solution is returned through line 38 to anode section 10. Simultaneously, fresh sodium hydrosulfite is continuously added to anode section 10 through line 40.

Another embodiment of this invention is illustrated in FIGURE 2, where parts corresponding to those in FIGURE 1 bear the same numeral. This embodiment and the operation thereof is substantially identical to the embodiment described in reference to FIGURE 1. The portion of the electrolyte of anode section 10, which contains hydroquinone, sodium hydrosulfite, and sodium bisulfite, is withdrawn continuously through line 52 and introduced into regeneration unit 50. In regeneration unit 50, the sodium bisulfite is chemically or electrically reduced back to sodium hydrosulfite after which it is returned through line 38 to anode section 10.

The sodium bisulfite may be chemically reduced back to sodium hydrosulfite by reacting it with chemicals, such as zinc in the presence of sulphurous acid or formic acid, removing any by-products formed during the regeneration of the fuel, and possibly adding some fresh sodium hydrosulfite to replace the fuel lost by formation of by-products during the regeneration thereof. The sodium bisulfite may also be reduced by reversibly charging it, as represented by the equation:

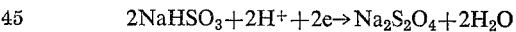
$2NaHSO_3 + 2H^+ + 2e \rightarrow Na_2S_2O_4 + 2H_2O$

As a specific example of the novel fuel cell of this invention, a 40-gram portion of potassium hydroxide was dissolved in distilled water to make 200 milliliters of solution. Then 2.0 grams of the sodium salt of anthrahydroquinone -β-sulfonate and 15.0 grams of sodium hydrosulfite were dissolved in 100 milliliters of the potassium hydroxide solution, and the resulting solution was placed in a beaker. The rest of the solution was placed in a second beaker and in a bridge connecting the two beakers. Electrodes made of platinum screen (80 mesh, 2"×2") were introduced into each beaker, and oxygen was bubbled through the beaker containing only aqueous alkali. The difference in potential between the two electrodes was found to be 0.80 volt. When the beaker containing the quinone solution was heated to 150° F., the voltage increased to 0.85 volt. After three days of operation when the test was terminated, this voltage still existed and no polarization of the cell was observed.

Although our invention has been described in relation to specific embodiments, various modifications will become apparent to those skilled in the art which fall within its intended scope. For example, while the invention was described on the basis of using hydroquinones as the reversibly-oxidizable intermediate reductant in the anode section, it will be apparent that other componnds may be similarly used. Any compound which is capable of regenerating the reduced form of the reversibly-oxidizable intermediate reductant from its oxidized form can be used as the primary fuel. The novel fuel cell of this invention can be used to obtain a constant voltage output at ambient as well as elevated temperatures. In general, the scope of this invention is intended to include the addition to the electrolyte of a compound that reacts in the electrolyte to remove water formed as a by-product in the operation of the fuel cell to produce a compound that can readily be removed from the electrolyte.

The embodiments of the invention in which an exclusive property or privilege is claimed are defined as follows:

1. An electrochemical process for generating electricity which comprises disposing an oxygen electrode and a fuel electrode in spaced relationship in an aqueous alkaline electrolyte solution containing a reversibly-oxidizable polyhydric phenol consisting essentially of a hydroquinone, introducing free oxygen in said electrolyte in effective proximity to said oxygen electrode, whereby the oxygen reacts with said electrolyte to form hydroxyl ions and release electrical charges to said oxygen electrode and said polyhydric phenol is oxidized by reacting with hydroxyl ions in said electrolyte to form water and release electrical charges to said fuel electrode, contacting with said electrolyte a compound of the group consisting of sodium hydrosulfite and ethylene, whereby said compound is oxidized by the oxidized form of said polyhydric phenol and the oxidized form of said polyhydric phenol is converted back to the reduced form, and withdrawing electrical energy from said electrodes.

2. A process according to claim 1 which includes the step of dividing said electrolyte into two confined zones in electrolytic communication with each other, said zones being a cathodic zone containing said oxygen electrode and wherein the oxygen is introduced, and an anodic zone containing said fuel electrode and polyhydric phenol and wherein said compound is contacted with said electrolyte, said zones being divided such as to permit the migration of hydroxyl ions formed in said cathodic zone to said anodic zone.

3. A process according to claim 2 in which said confined zones are maintained in electrolytic communication with each other by maintaining a third confined zone in electrolytic communication with said first and second confined zones.

4. A process according to claim 3 in which said confined zones are separated from each other by ion-permeable membranes.

5. A process according to claim 1 in which said polyhydric phenol is hydroquinone and said compound is ethylene.

6. A process according to claim 1 in which said compound is sodium hydrosulfite.

7. A process according to claim 6 in which said aqueous electrolyte solution contains an alkali metal hydroxide.

8. A process according to claim 7 in which said hydroquinone is the sodium salt of anthrahydroquinone-β-sulfonate.

9. A process according to claim 7 in which the oxidized form of said compound is removed from said electrolyte and the reduced form of said compound is continuously added thereto.

10. A process according to claim 9 in which the oxidized form of said compound is continuously removed from said electrolyte and regenerated, and said regenerated compound is added to said electrolyte.

11. In an electrochemical process for generating electricity which comprises disposing an oxygen electrode and a fuel electrode in spaced relationship in an aqueous alkaline electrolyte solution containing a reversibly-oxidizable polyhydric phenol consisting essentially of a hydroquinone, introducing free oxygen in said electrolyte in effective proximity to said oxygen electrode, whereby the oxygen reacts with said electrolyte to form hydroxyl ions and release electrical charges to said oxygen electrode and said polyhydric phenol is oxidized by reacting with hydroxyl ions in said electrolyte to form water and release electrical charges to the fuel electrode, and withdrawing electrical energy from said electrodes, the improvement which comprises adding to said electrolyte a compound consisting essentially of sodium hydrosulfite which will react in said electrolyte under conditions to consume water and produce a reaction product readily removable from said electrolyte.

12. A process according to claim 11 which includes removing said reaction product from said electrolyte.

13. An electrochemical process for generating electricity which comprises disposing an oxygen electrode and a fuel cell electrode in spaced relationship in an aqueous alkaline electrolyte solution containing a compound selected from the group consisting of hydroquinone, anthrahydroquinone, diphenohydroquinone, o-benzohydroquinone, β-naphthohydroquinone, α-naphthohydroquinone and the sodium salt of anthrahydroquinone-β-sulfonate, introducing free oxygen in said electrolyte in effective proximity to said oxygen electrode, whereby the oxygen reacts with said electrolyte to form hydroxyl ions and release electrical charges to said oxygen electrode and said compound is oxidized by reacting with hydroxyl ions to form water and release electrical charges to said fuel electrode, contacting said electrolyte with sodium hydrosulfite whereby said sodium hydrosulfite is oxidized by the oxidized form of said compound and the oxidized form of said compound is converted back to the reduced form, and withdrawing electrical energy from said electrodes.

References Cited by the Examiner

UNITED STATES PATENTS

| | | | |
|---|---|---|---|
| 2,901,522 | 8/1959 | Bopp | 136—86 |
| 2,976,342 | 3/1961 | Morehouse et al. | 136—86 |
| 3,113,049 | 12/1963 | Worsham | 136—86 |

WINSTON A. DOUGLAS, *Primary Examiner.*

JOHN R. SPECK, *Examiner.*